(12) United States Patent
Lin et al.

(10) Patent No.: US 10,462,978 B2
(45) Date of Patent: Nov. 5, 2019

(54) FLIP-CHIP FLUORESCENT LENS, LIGHTING MODULE INCLUDING THE FLIP-CHIP FLUORESCENT LENS, ORGANISM CULTIVATION APPARATUS, AND LIGHTING MODULE MODIFICATION METHOD

(71) Applicant: Hsiao-Cheng Lin, Kaohsiung (TW)

(72) Inventors: Hsiao-Cheng Lin, Kaohsiung (TW);
Chin-Yu Lin, Kaohsiung (TW);
Yin-Feng Wang, Kaohsiung (TW);
Li-Xin Tang, Kaohsiung (TW)

(73) Assignee: Hsiao-Cheng Lin, Kaohsiung (TW)

( * ) Notice: Subject to any disclaimer, the term of this patent is extended or adjusted under 35 U.S.C. 154(b) by 213 days.

(21) Appl. No.: 15/495,063

(22) Filed: Apr. 24, 2017

(65) Prior Publication Data
US 2018/0020623 A1 Jan. 25, 2018

(30) Foreign Application Priority Data
Jul. 25, 2016 (TW) .............................. 105123465 A

(51) Int. Cl.
*A01G 7/00* (2006.01)
*F21V 9/00* (2018.01)
(Continued)

(52) U.S. Cl.
CPC ............... *A01G 7/045* (2013.01); *F21K 9/64* (2016.08); *F21V 5/04* (2013.01); *F21V 9/30* (2018.02);
(Continued)

(58) Field of Classification Search
CPC . F21V 5/048; F21V 5/10; F21L 15/02; A01G 7/045
See application file for complete search history.

(56) References Cited

U.S. PATENT DOCUMENTS

2004/0223315 A1* 11/2004 Suehiro ................. H01L 33/507
362/84
2011/0317432 A1* 12/2011 Lee ............................ F21V 5/04
362/335

(Continued)

OTHER PUBLICATIONS

Kim et al, Luminescence properties of CaAlSiN3:Eu2+ phosphor prepared by direct-nitriding method using fine metal hydride powders, available online Jan. 19, 2015, Elsevier, Journal of Alloys and Compounds, pp. 97-103 (Year: 2015).*

*Primary Examiner* — Sean P Gramling
*Assistant Examiner* — Keith G. Delahoussaye
(74) *Attorney, Agent, or Firm* — WPAT, PC

(57) ABSTRACT

A flip-chip fluorescent lens includes a light-permeable member and a fluorescent member. The light-permeable member includes a first face and a second face opposite to the first face. A light condensing portion protrudes from the first face. The second face is recessed toward the light condensing portion to form a chamber in which the fluorescent member is filled. The fluorescent member is exposed and is made of a mixture of a transparent colloid and fluorescent powder. A lighting module includes the flip-chip fluorescent lens and a light-emitting member covered by the fluorescent member and detachably engaged with the flip-chip fluorescent lens. The lighting module can be placed into a container to form an organism cultivation apparatus for growing plants. A lighting module modification method is provided to change the color of the light emitted by a lighting module to be modified.

1 Claim, 4 Drawing Sheets

(51) Int. Cl.
  *A01G 7/04* (2006.01)
  *F21K 9/64* (2016.01)
  *F21V 9/30* (2018.01)
  *F21V 5/04* (2006.01)
  *F21Y 115/10* (2016.01)
  *F21K 9/90* (2016.01)

(52) U.S. Cl.
  CPC ............. *F21K 9/90* (2013.01); *F21Y 2115/10* (2016.08); *Y02P 60/149* (2015.11)

(56) References Cited

U.S. PATENT DOCUMENTS

2012/0112130 A1* 5/2012 Wu .................... C09K 11/7774
 252/301.4 P
2013/0126927 A1* 5/2013 Iguchi .................... H01L 33/60
 257/98
2017/0094914 A1* 4/2017 Paquette .............. F21V 14/006

* cited by examiner

FLIP-CHIP FLUORESCENT LENS, LIGHTING MODULE INCLUDING THE FLIP-CHIP FLUORESCENT LENS, ORGANISM CULTIVATION APPARATUS, AND LIGHTING MODULE MODIFICATION METHOD

CROSS REFERENCE TO RELATED APPLICATIONS

The application claims the benefit of Taiwan application serial No. 105123465, filed on Jul. 25, 2016, and the entire contents of which are incorporated herein by reference.

BACKGROUND OF THE INVENTION

1. Field of the Invention

The present invention relates to an optical lens and, more particularly, to a flip-chip fluorescent lens, a lighting module including the flip-chip fluorescent lens, an organism cultivation apparatus including the lighting module, and a lighting module modification method for changing a color of light emitted by a lighting module to be modified.

2. Description of the Related Art

The color of light emitted by a single light-emitting diode (LED) is a mixture of another color of light from a die and a complementary color of excited fluorescent powder, and the resultant light can be applied to display or illumination in such as street lamps, aquariums, and plant cultivation containers.

Taking a commonly used white light source for street lamps as an example, white light is generated with an appropriate ratio of a bluelight-emitting die to yellow fluorescent powder. The yellow fluorescent powder is generally encapsulated above the bluelight-emitting die with a transparent colloid to form a white light LED that can be pre-assembled into a white light module to facilitate use through circulation.

Nevertheless, the conventional die produces heat when electrified to emit light. The heat causes gradual deterioration of the encapsulating colloid, leading to a change in the color of the emitted light as time passes. As a result, continued use of the die is not suitable, and replacement of the whole device is required just because of deterioration of the encapsulating colloid. Furthermore, the die could malfunction due to poor heat dissipation, and the whole white light module must be replaced.

Thus, the above disadvantages of the prior art should be solved to meet practical use while increasing the utility.

SUMMARY OF THE INVENTION

An objective of the present invention is to provide a flip-chip fluorescent lens for a lighting module to permit a change in the color of the emitted light.

Another of the present invention is to provide a lighting module permitting a change in the color of the emitted light.

A further objective of the present invention is to provide an organism cultivation apparatus including the lighting module permitting a change in the color of the emitted light.

Still another objective of the present invention is to provide a lighting module modification method for modifying a color of light emitted by a lighting module.

In a first aspect, a flip-chip fluorescent lens for a lighting module includes a light-permeable member and a fluorescent member. The light-permeable member includes a first face and a second face opposite to the first face. A light condensing portion protrudes from the first face. The second face is recessed toward the light condensing portion to form a chamber. The fluorescent member is filled in the chamber and is exposed.

In an example, the fluorescent member is made of a mixture of a transparent colloid and fluorescent powder. The fluorescent power is red fluorescent powder of $CaAlSiN_3$:$Eu^{2+}$, and wherein the fluorescent member includes 0.1 wt % to 90 wt % of red fluorescent powder. The chamber includes an inner face. The inner face is recessed toward the light condensing portion to form a concave spherical surface. The light condensing portion includes a plurality of focusing spheres. The second face of the light-permeable member includes at least one positioning protrusion. The flip-chip fluorescent lens can be used in applications requiring a change in the color of emitted light. Furthermore, electronic elements that are supposed to be discarded can be modified to provide a new function, prolonging the service life of the currently available light-emitting members while meeting the green concept of reuse. When applied to plant cultivation, adjustment of the ratio of red spectrum light to blue spectrum light required for plant growth process can be achieved. The electricity required for unwanted yellow spectrum light and green spectrum light for green plants can be reduced to save the costs.

In a second aspect, a lighting module includes the above flip-chip fluorescent lens and a light-emitting member covered by the fluorescent member and adapted to be electrically connected to a circuit board. The light-emitting member and the flip-chip fluorescent lens are detachably engaged with each other.

The light-emitting member can be electrically connected to a circuit board, such that the light-emitting member can be located in an appropriate position through use of the circuit board. Furthermore, the circuit board can be used to electrically connect with another circuit board or a power supply.

In a third aspect, an organism cultivation apparatus includes the lighting module and a container in which the lighting module is received.

In a forth aspect, a lighting module modification method includes obtaining a lighting module to be modified. The lighting module includes at least one light-emitting member having a lighting surface. The lighting surface is adapted to be electrified to emit light of a first color. The lighting surface is covered by a substance containing fluorescent powder. Then, the substance containing the fluorescent powder is removed to expose the lighting surface of the at least one light-emitting member. Next, the lighting surface of the light-emitting member is covered with a fluorescent member of a flip-chip fluorescent lens. The fluorescent member is configured to be excited by light from the at least one light-emitting member to emit light of a second color different from the first color.

The flip-chip fluorescent lens, the lighting module, the organism cultivation apparatus, and the light the lighting module modification method according to the present invention can be applied to various conditions requiring illumination and a change in the color of the emitted light. Furthermore, electronic elements that are supposed to be discarded can be modified to provide a new function, prolonging the service life of the currently available light-emitting members while meeting the green concept of reuse.

Accordingly, the effects of avoiding discard of light-emitting members merely because of deterioration of encapsulant and of reuse of electronic elements by modification can be accomplished. When applied to cultivation of plants, the spectrum and photosynthesis photon flux density required for growth of plants are provided to serve as the basis for reinforcing the quality and quantity of the light during growing of the plants. Thus, insufficient illumination in the environment of the plants can be compensated, achieving the effect of adjusting light compensation for plants according to need. In comparison with conventional agricultural cultivation failing to compensate the illumination according to the actual need of plants, the organism cultivation apparatus according to the present invention can more accurately supply plants with required color and quantity of light.

The present invention will become clearer in light of the following detailed description of illustrative embodiments of this invention described in connection with the drawings.

DETAILED DESCRIPTION OF THE INVENTION

As used herein, the term "flip-chip" refers to an object (such as a lens) which covers a surface of the light-emitting member (such as a light-emitting diode), which can be appreciated by one having ordinary skill in the art.

Figure 1:
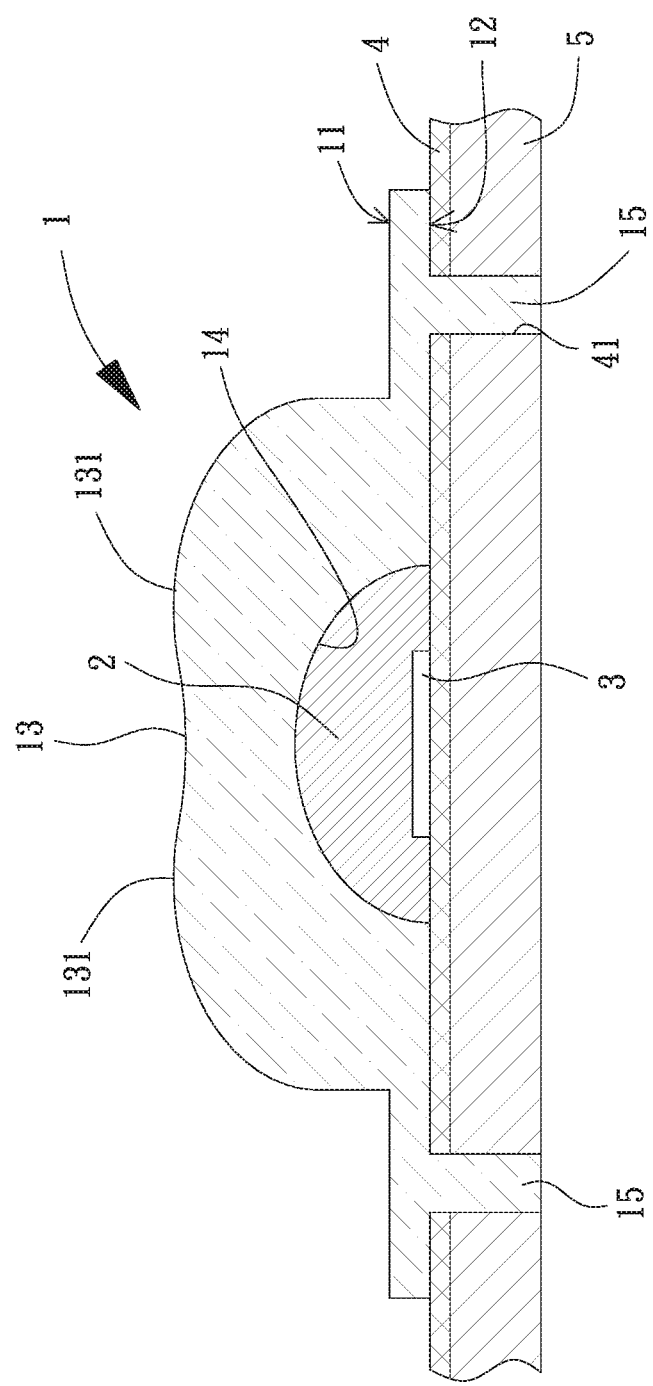
FIG. 1 is a diagrammatic cross sectional view of a lighting module using a flip-chip fluorescent lens of an embodiment according to the present invention.
Figure 2:
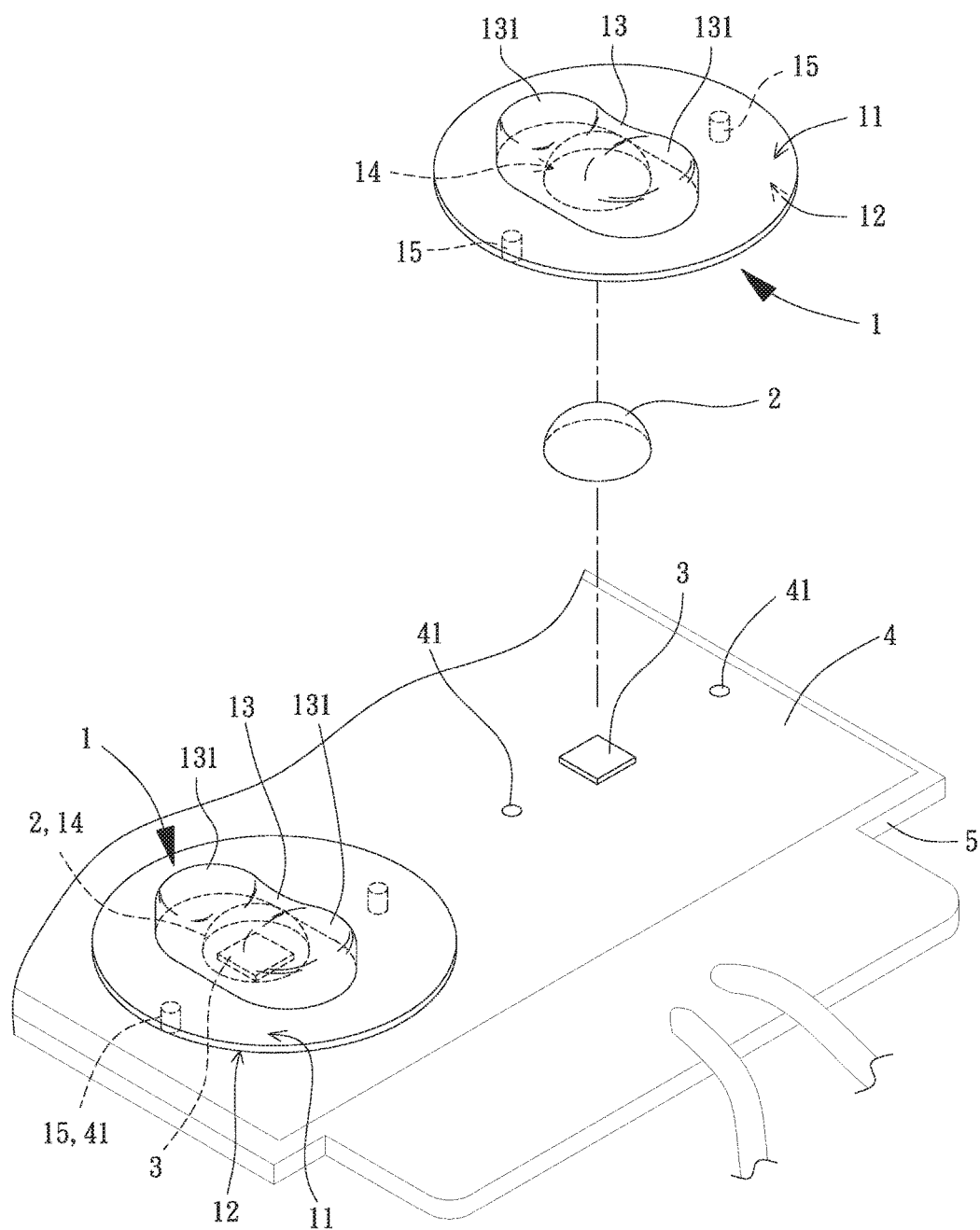
FIG. 2 is a partial, exploded, perspective view of the lighting module using the flip-chip fluorescent lens of the embodiment according to the present invention.

A flip-chip fluorescent lens and a lighting module using the flip-chip fluorescent lens of an embodiment according to the present invention are shown in FIGS. 1 and 2. In this embodiment, the flip-chip fluorescent lens includes a light-permeable member 1 and a fluorescent member 2. The light-permeable member 1 includes a first face 11 and a second face 12 opposite to the first face 11. A light condensing portion 13 protrudes from the first face 11. The second face 12 is recessed toward the light condensing portion 13 to form a chamber 14. The fluorescent member 2 is filled in the chamber 14 of the light-permeable member 1 to cover the light-emitting member 3. Non-restrictive examples will be set forth hereinafter.

With reference to FIGS. 1 and 2, the light-permeable member 1 can be made from transparent material, such as glass, silicone, etc., by milling or injection molding. The first face 11 and second face 12 opposite to each other can be flat. The light condensing portion 13 includes a plurality of focusing spheres 131 to improve the light concentrating effect in the light emitting range. The chamber 14 includes an inner face which is recessed toward the light condensing portion 13 to form a concave spherical surface to improve the light concentrating effect (see FIG. 2). The light-permeable member 1 includes a surface (such as the second face 12 in which the chamber 14 is defined) having at least one positioning protrusion 15. Each positioning protrusion 15 can be cubic or cylindrical. Thus, the light-permeable member 1 can be mounted to a substrate 4 including a plurality of positioning holes 41 engaged with the positioning protrusions 15 (FIG. 2) to cover the light-emitting members 3 on the substrate 4. The substrate 4 can be connected to a circuit board 5 for electrical connection with the light-emitting member 3.

The fluorescent member 2 is made of a mixture of a transparent colloid (such as epoxy) and fluorescent powder to form an elastomer. A semi-product of the fluorescent member 2 can be filled into the chamber 14 and then dried. Alternatively, the fluorescent member 2 can be formed in advance and then filled into the chamber 14 (FIG. 2). The fluorescent member 2 can be red fluorescent powder of $CaAlSiN_3:Eu^{2+}$. The fluorescent member 2 includes 0.1 wt % to 90 wt % of red fluorescent powder. When the fluorescent member 2 includes 3.23 wt % to 9.10 wt % of red fluorescent powder, it is more suitable for cultivating plants. In use, the light-emitting member 3 (such as a die of a blue LED) is covered by the fluorescent member 2, such that the red fluorescent powder of the fluorescent member 2 is excited by the light from the light-emitting member 3 to emit a colored light with a red spectrum. In an alternative example, the fluorescent member 2 can be made of fluorescent powder by compression. The embodiments described above can be applied to illumination devices which need to change the color of the emitted light. When the embodiment is applied to plant cultivation, it facilitates adjustment of the ratio of red spectrum light to blue spectrum light required for plant growth process. The electricity required for unwanted yellow spectrum light and green spectrum light for green plants can be reduced to save the costs.

Figure 3:
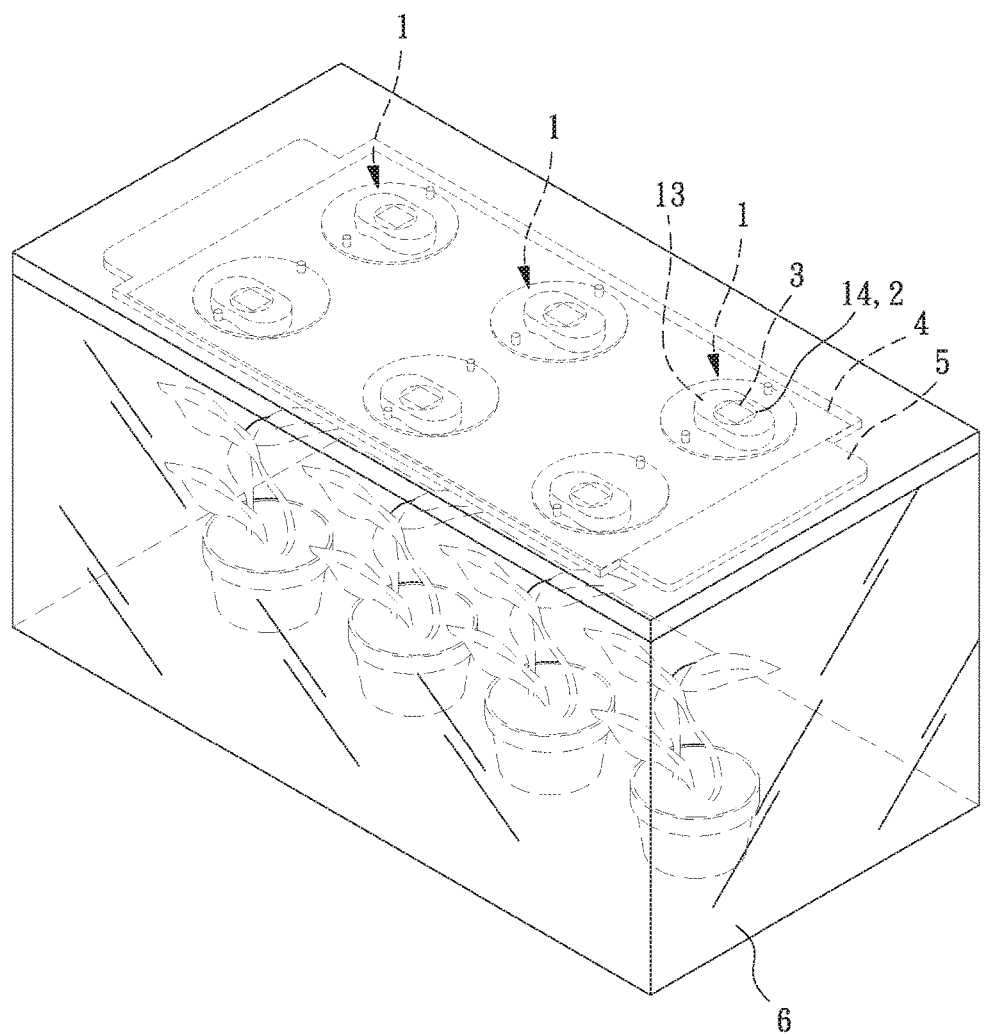
FIG. 3 is a perspective view of an organism cultivation apparatus of an embodiment according to the present invention.

With reference to FIG. 1, the flip-chip fluorescent lens can cover and combine with the light-emitting member 3 to form a lighting module, such as a lighting module including a single LED. The color of the emitted light is adjustable by changing the flip-chip fluorescent lens without replacing the whole lighting module. Therefore, the fluorescent member 2 is exposed before the flip-chip fluorescent lens is coupled with the light-emitting member 3. The light-emitting member 3 and the flip-chip fluorescent lens are detachably engaged with each other. When the flip-chip fluorescent lens is engaged with the light-emitting member 3, the flip-chip fluorescent lens covers the light-emitting member 3. Thus, the color of the light emitted by the lighting module can be changed by changing the flip-chip fluorescent lens without replacing the whole lighting module, avoiding discard of the lighting module just because of deterioration of the encapsulant. With reference to FIGS. 1 and 2, the lighting module of the embodiment including the light-emitting member 3 can be electrically connected to a circuit board 5. Thus, the light-emitting member 3 can be located in an appropriate position through use of the circuit board 5. Furthermore, the circuit board 5 can include at least one wire unit for electrical connection with another circuit board or a power supply. With reference to FIG. 3, the lighting module can be placed into a container 6 to form an organism cultivation apparatus, such as an aquarium or a plant cultivation container, providing a light source for the to-be-cultivated organism from the top, bottom or side of the container 6. However, the present invention is not limited to this example.

Figure 4:
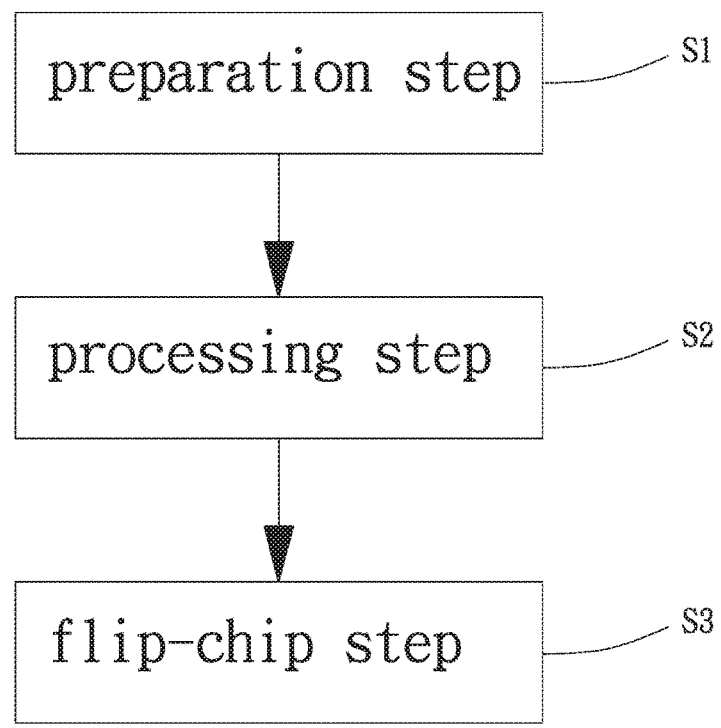
FIG. 4 is a block diagram illustrating a lighting module modification method of an embodiment according to the present invention.

Furthermore, a lighting module modification method for changing the color of the light emitted by a lighting module is also provided. For example, in a case that the light emitted by a lighting module is not of the desired color, the lighting module modification method can be used to change the color of the light emitted by the lighting module. With reference to FIG. 4, in an example, the lighting module modification method includes a preparation step S1, a processing step S2, and a flip-chip step S3. The preparation step S1 includes obtaining a color-of-light-to-be-modified lighting module by manpower or machinery. The lighting module includes at least one light-emitting member having a lighting surface. The lighting surface is adapted to be electrified to emit light of a first color. The lighting surface is originally covered by a substance containing fluorescent powder. The processing step S2 includes removing the substance containing the fluorescent powder to expose the lighting surface of the light-emitting member. The flip-chip step S3 includes covering the lighting surface of the light-emitting member with a fluorescent member 2 of a flip-chip fluorescent lens. The fluorescent member 2 is configured to be excited by the light from the light-emitting member to emit light of a second color different from the first color. In an example, the color-of-light-to-be-modified lighting module can be a die of a currently available LED. The lighting surface of the die can be coated with a layer of fluorescent powder. The fluorescent powder and the light-emitting member are then encapsulated with a colloid. Alternatively, the fluorescent powder can be mixed into the colloid and then encapsulated with the colloid. The encapsulating structure and removal of the fluorescent powder can be appreciated by one having ordinary skill in the art. After the lighting surface of the light-emitting member has been covered by the fluorescent member 2 of the flip-chip fluorescent lens, the flip-chip fluorescent lens can be coupled to a substrate (such as by bonding, coupling, or buckling) on which the light-emitting member is located. Thus, the electronic element that is supposed to be discarded can be modified to provide a new function, prolonging the service life of the currently available light-emitting member while meeting the green concept of reuse. Non-restrictive examples of use will be set forth hereinafter.

In an example, the color-of-light-to-be-modified lighting module can be a white light module for street lamps or plant cultivation containers. The lighting module generally includes a plurality of LEDs. The encapsulant of each LED generally packages the fluorescent powder and the light-emitting member as an inseparable member. When the encapsulant deteriorates over time, replacement of a single LED cannot be achieved. Thus, replacement of the whole lighting module is necessary when there are too many LEDs requiring replacement. However, the lighting module that is conventionally supposed to be replaced can still be electrified to emit light. In this case, certain equipment can be used to remove the fluorescent powder and the encapsulant (such as by scraping or cutting) to expose the lighting surface of the light-emitting member. Then, the lighting surface of the light-emitting member is covered with the fluorescent member 2 of a flip-chip fluorescent lens to form a reconstructed lighting module. The light generated by the light-emitting member excites the fluorescent powder of the fluorescent member 2 to provide light of a specific color. Thus, the lighting module is modified. In an example, a to-be-replaced white light module for street lamps can be modified with the above method for subsequent use in replacement of another to-be-replaced white light module for street lamps. Alternatively, the color of the light of the to-be-replaced white light module for street lamps can be changed to a color required for a plant cultivation container. Non-restrictive examples of application in plant cultivation will be set forth hereinafter.

In an example, a conventional plant cultivation container can be modified by the embodiment of above lighting module modification method into an organism cultivation apparatus for cultivation of plants. Taking ice plants as an example, the growth of green plants needs blue spectrum light and red spectrum light. Although the continuous spectrum of the white LED can be used as the light source for cultivation, the yellow spectrum light and green spectrum light in the continuous spectrum are unnecessary for the growth of the green plants, and the white LED consumes more electricity than an LED with red spectrum light and blue spectrum light. Thus, a light source only generating red spectrum light and blue spectrum light is utilized.

In an example of the blue spectrum light and red spectrum light, four light-emitting members 3 and a fluorescent member 2 (which is red fluorescent powder of $CaAlSiN_3:Eu^{2+}$) were used. The blue light from the light-emitting members 3 was excited the red fluorescent powder of the fluorescent member 2 to emit blue spectrum light and red spectrum light. The fluorescent member 2 included 3.23 wt %, 4.00 wt %, 4.76 wt %, and 9.10 wt % of red fluorescent powder to generate spectrums respectively having blue light/red light ratios of 0.49, 0.20, 0.09, and 0.02 as four experimental cultivating conditions. The result shows that the blue light/red light ratio of 0.20 (corresponding to the fluorescent member 2 including 4.00 wt % of red fluorescent powder) was the best cultivating condition for cultivating ice plants. The ice plants can be harvested after five weeks instead of seven weeks using the conventional daylight cultivation method. The organism cultivation apparatus of the embodiment according to the present invention can be applied to the process of the light fertilization for cultivation of plants to reduce time and costs while increasing the yield. The loss resulting from price fluctuation in conventional agricultural cultivation methods can be avoided, which is advantageous to the development of agricultural economics.

The flip-chip fluorescent lens, the lighting module, the organism cultivation apparatus, and the light the lighting module modification method of the embodiments according to the present invention can be applied to various conditions requiring illumination and a change in the color of the emitted light. Furthermore, electronic elements that are supposed to be discarded can be modified to provide a new function, prolonging the service life of the currently available light-emitting members while meeting the green concept of reuse. Accordingly, the effects of avoiding discard of light-emitting members merely because of deterioration of encapsulant and of reuse of electronic elements by modification can be accomplished.

When the embodiments according to the present invention are applied to cultivation of plants, the spectrum and photosynthesis photon flux density (PPFD) required for growth of plants are provided to serve as the basis for reinforcing the quality and quantity of the light during growing of the plants. Thus, insufficient illumination in the environment of the plants can be compensated, achieving the effect of adjusting light compensation for plants according to need. In comparison with conventional agricultural cultivation failing to compensate the illumination according to the actual need of plants, the organism cultivation apparatus of the embodiment according to the present invention can more accurately supply plants with required color and quantity of light.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A lighting module modification method comprising:
    obtaining a lighting module to be modified, with the lighting module including at least one light-emitting member having a lighting surface, wherein the lighting surface is adapted to be electrified to emit light of a first color, and wherein the lighting surface is covered by a substance containing fluorescent powder;
    removing the substance containing the fluorescent powder to expose the lighting surface of the at least one light-emitting member; and
    covering the lighting surface of the at least one light-emitting member with a fluorescent member of a flip-chip fluorescent lens, wherein the fluorescent member is configured to be excited by light from the at least one light-emitting member to emit light of a second color different from the first color.

* * * * *